2,708,421
DISPENSING DEVICE
Robert J. Jauch, Fort Wayne, Ind.

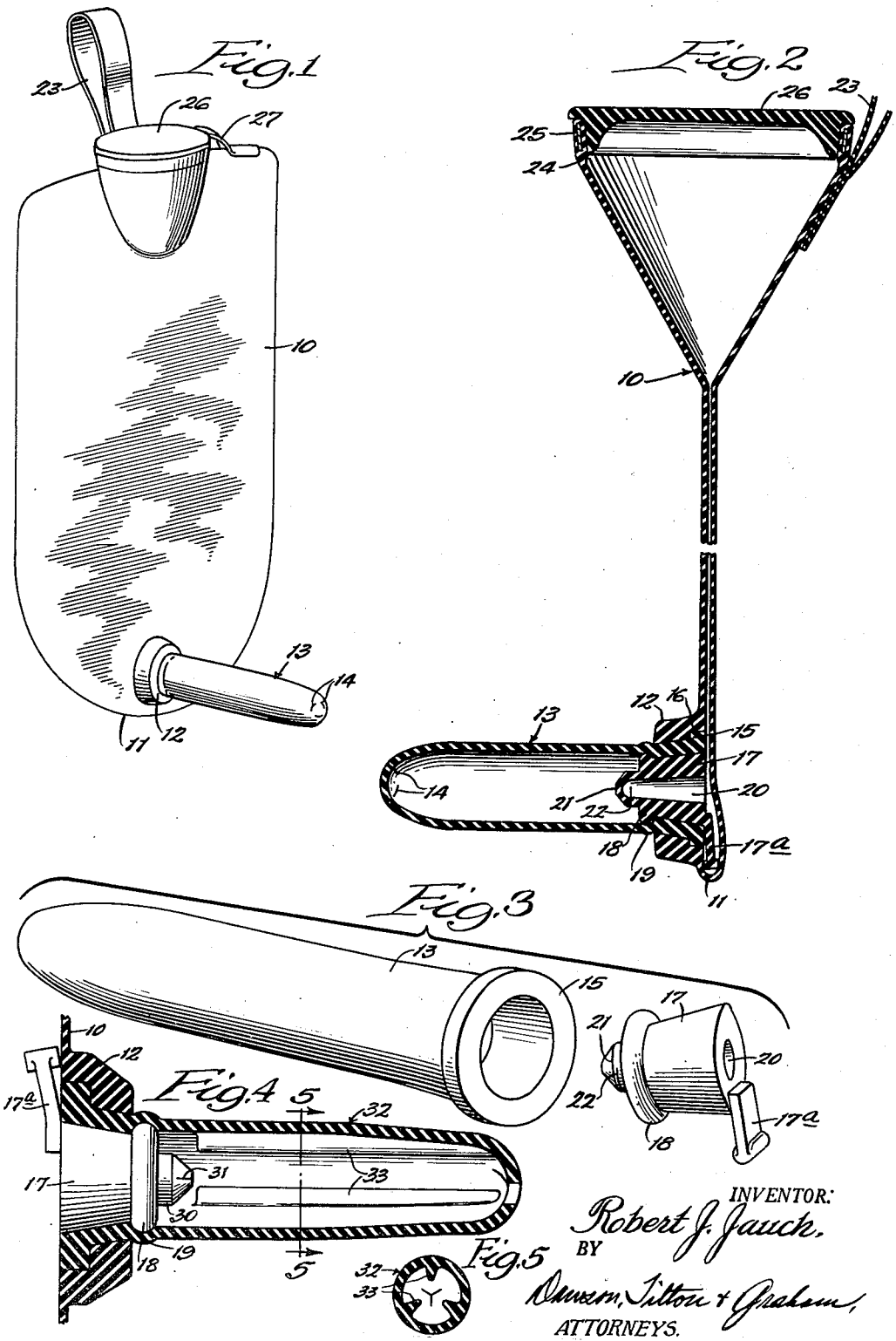

Application December 17, 1953, Serial No. 398,724

5 Claims. (Cl. 119—71)

This invention relates to a dispensing device and method which are particularly useful in the dispensing of milk and other feed fluids through a nipple, etc. The invention is illustrated herein in connection with a feeder device for calves and other animals, but it will be understood that the invention has broader application.

In the feeding of calves and the like by suspending a pail containing milk or other liquid, the pail being equipped with an outlet nipple, it is found that there are many serious disadvantages. The calf, in sucking upon the nipple, draws in considerable amounts of air. The feed tends to run out of the mouth of the calf. The feed liquid is contaminated with insects, etc. In feeding, the calf often butts the pail, and the metal structure causes injury to the calf. One of the most serious disadvantages, however, is that air accumulates in the stomach of the calf and the calf fails to take on as much weight as it should.

An object of the present invention is to overcome the disadvantages described above and to provide simple and effective means and method steps whereby effective feeding of the calf or other animal can be brought about. A further object is to provide a feeding device in which air is not drawn into the mouth of the calf through the nipple in the feeding operation. A still further object is to provide a feeding device in which there is positive displacement in the sucking operation, giving the calf the increment of feed desired so that there is no dripping of the feed material from the mouth and no spillage from the container. A still further object is to provide a collapsible sealed bag which tends to flatten out when the milk or fluid feed supply is gone and to exclude air from the interior of the bag. Yet another object is to provide a flexible collapsible sealed container with a resilient dispensing nipple, or the like, connected therewith, and in which the nipple completely empties in the sucking operation without the formation of foam, etc. Other specific objects and advantages will appear as the specification proceeds.

The invention is shown, in an illustrative embodiment, by the accompanying drawing, in which—

Figure 1 is a perspective view of a dispensing container embodying my invention and illustrating a structure in which the method herein set forth may be employed; Fig. 2 an enlarged sectional view of the structure shown in Fig. 1; Fig. 3, an enlarged perspective view showing the nipple and inner valve thereof in spaced-apart relation; Fig. 4, a longitudinal sectional view of a nipple and valve structure constituting a modified form of the invention; and Fig. 5, a transverse sectional view, on a reduced scale.

In the illustration given in Figs. 1 to 3, inclusive, 10 designates a flexible, collapsible, sealed container having a rounded lower end 11 provided with an integral outlet tube or sleeve 12. Within the tube 12 is secured a nipple 13 having at its outer end discharge slits 14 and having at its inner end a laterally-extending annular flange 15 received within a recess 16 with which the sleeve or annular boss 12 is provided.

In the entrance to the nipple 13, I place a closure plug 17 having an integral locking ring or shoulder 18 adapted to distend the nipple at 19. It will be noted that the distension of the nipple at 19 due to the inner valve shoulder 18 forms a reverse lock with the collar or boss 12. If desired, the plug 17 may be provided with a draw-tab 17a to facilitate removal of the plug 17 from the nipple 13.

The plug 17 is provided with a passage 20 extending therethrough, and the inner end of the passage 20 is normally closed by a resilient valve 21 having a transverse slit 22. Under the influence of vacuum, the valve 21 tends to open along the slit 22 so that fluid will flow through passage 20 and into the nipple 13 to fill the nipple.

I prefer to equip the bag or container 10 at the top with a strap loop 23, so that the container may be suspended at a desired elevation. Also, I provide the container 10 near its top with a circular inlet 24 employing a metal reinforced band 25 for stiffening the material of the bag at this point. A closure plug 26 is arranged to form an airtight seal with the cylindrical inlet portion 24 of the container 10, and I prefer to secure the cap or closure 26 to the bag 10 by means of a flexible strap 27.

The container 10 may be formed of waterproof fabric, rubber, synthetic rubber, rubber reinforced fabric, or by a variety of other materials which will enable the bag to collapse as the liquid contained therein is withdrawn. The nipple 13 and valve plug 17 may also be formed of rubber, palstic, synthetic rubber, or other suitable material. The resilience of the tube 13 is desired in that after the removal of the liquid contents from the nipple, there is an expansion of the nipple to its original shape, thus producing a vacuum within the nipple chamber and inducing liquid flow from the container 10 and into the nipple.

In the operation of the device, the container 10 is filled with milk or other feed fluid and the closure 26 is pressed firmly into position, as illustrated in Fig. 2, to form an airtight closure for the container. Because of the compact character of the filled contents, the operator can carry a large number of them to the point where the containers are to be suspended. Each container is suspended by its strap 23, or by other suitable means, upon a fixed support, and the calf or other animal may then feed by compressing the nipple 13 in the usual manner. The compression of the nipple 13 causes the milk or liquid contained therein to be discharged positively through the forward slits or outlets 14, the valve 21 preventing any backward flow of the material into the container.

As the liquid is drawn from the container 10 and through the nipple 13 by the repeated compression and release of the nipple 13, the flexible walls of the container 10 tend to collapse and thus cause the liquid to feed readily into the nipple 13 as it tends to restore its shape after each compression cycle. When substantially all of the liquid is removed from the container 10, the walls collapse to the position shown in Fig. 2 and the nipple also, after the last compression stop, tends to remain in collapsed condition.

In the foregoing operation, since air is excluded by the closure 26 from entering the container, there is no tendency for air to pass from the container and through the nipple into the mouth of the calf or other animal. Foaming and consequent dripping of the liquid from the mouth of the calf is eliminated. Calves fed by this method are found to be sleek in appearance and to gain weight more rapidly than calves fed employing prior methods where air is drawn into the stomach of the calf with the feed. The entire collapsing of the apparatus tends to exclude air from the interior of the nipple and container and thus to reduce bacterial action therein.

In the cleaning operation, it is merely necessary to remove the closure 26. The plug 17 may then be drawn from the nipple and the nipple readily removed. The separated parts may then be cleaned and the structure reassembled as shown in Fig. 2. A large number of the collapsed bag structures can be handled by a single person, in sharp contrast with the difficulty heretofore experienced in the handling of large rigid pails.

In the structure shown, the plug 17, when inserted within the nipple in the position shown in Fig. 2, locks the nipple firmly in position against dislodgment. At the same time, ready disassembly can be accomplished as heretofore described, by simply pulling the tab 28 into the interior of the container 10.

If desired, the nipple 13, which is shown separately from the container 10, may be formed integrally with the container 10. I prefer the separate nipple shown, however, because of the advantage flowing from disassembly in the washing and cleaning of the structure.

In the operation above described, it will be noted that the flexible character of the container 10 provides a distinct advantage in that it causes the contents of the container to be churned and mixed as the bag or container is butted by the calf, so that the butting action, which is normal and natural for the calf, is thus turned to advantage in the agitating of the milk substitute or liquid feed which it is desired to keep in suspension within the container.

In the modification shown in Figs. 4 and 5, the inner valve plug 30 is provided with a central slit 31 in the tip of the cone. This slit leaves the cone halves free to open and close and thus forms a check valve. This is a slower acting valve in filling the nipple, and is desirable for many uses. The horizontally-slitted valve 21 shown in Figs. 2 and 3 leaves a portion of the rubber to act as a hinge cap like a check valve, and such a valve is effective in rapidly charging the nipple.

In the structure shown in Figs. 4 and 5, the nipple 32 is provided with three spaced, longitudinally-extending ribs 33 which have been found to be advantageous in controlling the discharge rate of the nipple. The nipple 32 may be employed with the structure shown in Fig. 2, or with the structure shown in Fig. 4. For the dispensing of certain fluids, it is found that the liquid feed flows too rapidly and it was desired to provide a nipple having the desired size and contour while at the same time reducing the rate of flow. By employing the longitudinal ribs 33, it is found that by the use of the ribs, a complete collapse of the nipple is prevented and a much lesser amount of feed is discharged from the nipple. In other words, while the nipples shown in Figs. 2 and 4 may be of substantially the same size and have almost the same liquid displacement, the actual discharge from the nipple shown in Fig. 4 may be not more than one-half that discharged from the nipple shown in Fig. 2, even though the same type of valve be employed with each nipple. The longitudinally-extending ribs on the interior of the nipple thus are effective far beyond their displacement value in controlling the discharge rate of the feed while at the same time strengthening the nipple and maintaining it with the desired contour.

In the method of dispensing fluid as described in the foregoing specification, it will be noted that the fluid is first introduced into the container while the top 26 is open and thus spreading the walls of the flexible container to receive the liquid. Thereafter, the top 26 is placed in position to seal the container so that no more air enters the container chamber. Continued operation of the nipple brings about the pumping of fluid from the container and along with the liquid there is removed the air originally introduced into the container. The continued pumping action thus causes the container walls to collapse to the thin position shown in Fig. 2, air being prevented from reentering the container by the check valve 21 or valve 30. In fact, as the pumping action continues, the nipples 13 and 22 also collapse under the vacuum existing therein. The containers thus, in collapsed condition, may be stacked and carried in large volume by a single operator, and further, due to the collapsed condition of the containers, there is greatly reduced the danger of bacterial contamination of the interior portions of the containers.

While the invention has been described in connection with a liquid feeder device, it will be understood that the principles of the invention may be employed for other purposes where liquid is to be dispensed through a tubular member or barrel connected with a container and for accomplishing the results which have been described.

While, in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. A liquid dispensing device, comprising a collapsible flexible container having an inlet and an outlet, a closure for said inlet providing a seal therefor, a resilient nipple communicating with said outlet and having a slit in its outer end, said nipple being provided on its inner side with an enlargement engaging the inner side of the container wall, and a longitudinally apertured plug adapted to be inserted from the inside of the bag and through the rear end of said nipple, said plug being equipped with an annular shoulder greater than the diameter of said nipple and pressing said nipple outwardly to form an annular distension thereof to lock said nipple against inward movement.

2. A liquid dispensing device, comprising a flexible container having an inlet and an outlet, a closure for said inlet, a resilient nipple communicating with said outlet and having a slit in its outer end, said nipple being provided on its inner side with a retaining flange adapted to engage the inside of the container, and a plug having a longitudinal passage therethrough closed at its outer end by a slitted resilient closure, said plug having adjacent said closure a resilient shoulder having a diameter greater than the diameter of said nipple, whereby when said plug is pressed within said nipple from the inner side of the bag, said shoulder distends the nipple to lock the same against inward movement.

3. The structure of claim 2, in which the plug is equipped on its inner side with a draw tab which extends laterally of the plug and along the inner side of the bag.

4. The structure of claim 2, in which the nipple is provided interiorly with spaced longitudinal ribs.

5. A liquid dispensing device, comprising a collapsible flexible container having an inlet and an outlet, a closure for said inlet providing an air-tight seal therefor, said outlet being provided with an annular sleeve, a resilient nipple having an outer slitted portion and an inner open portion, said inner portion of the nipple lying within said sleeve and having its rear edge substantially flush with the inner wall of the container, and a longitudinally apertured resilient plug adapted to be inserted within the inner portion of the nipple and from the inside of the bag to releasably anchor said nipple within the sleeve of said container, said plug being provided on its outer side with a slitted closure.

References Cited in the file of this patent

UNITED STATES PATENTS

| | | |
|---|---|---|
| 1,525,314 | Mullen | Feb. 3, 1925 |
| 2,143,719 | Schulte | Jan. 10, 1939 |
| 2,190,420 | Frederick et al. | Feb. 13, 1940 |
| 2,280,410 | Keltner | Apr. 21, 1942 |
| 2,329,347 | Graham | Sept. 14, 1943 |
| 2,446,451 | Allen | Aug. 3, 1948 |
| 2,517,457 | Allen | Aug. 1, 1950 |
| 2,607,319 | Shappee | Aug. 19, 1952 |